J. W. FOLGERT.
PIVOT FOR SHEARS.
APPLICATION FILED DEC. 21, 1912.
1,074,852.
Patented Oct. 7, 1913.
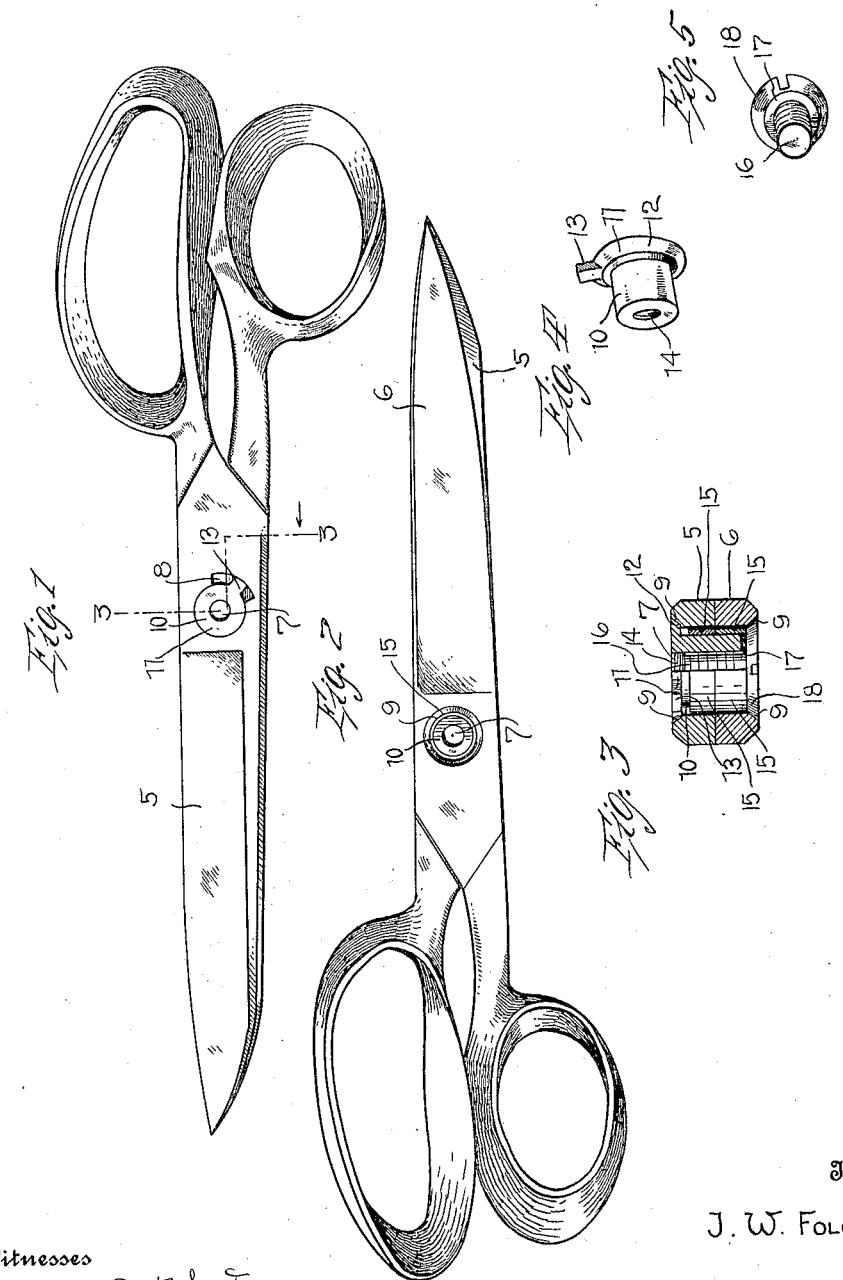
Witnesses
Robert M. Sutphen.
A. I. Hind.
Inventor
J. W. Folgert
By Watson E. Coleman
Attorney
COLUMBIA PLANOGRAPH CO., WASHINGTON, D. C.

UNITED STATES PATENT OFFICE.

JOSEPH W. FOLGERT, OF WORCESTER, WISCONSIN, ASSIGNOR OF ONE-HALF TO JAMES M. FRYSINGER, OF PHILLIPS, WISCONSIN.

PIVOT FOR SHEARS.

1,074,852.   Specification of Letters Patent.   Patented Oct. 7, 1913.

Application filed December 21, 1912. Serial No. 738,107.

*To all whom it may concern:*

Be it known that I, JOSEPH W. FOLGERT, a citizen of the United States, residing at Worcester, in the county of Price and State of Wisconsin, have invented certain new and useful Improvements in Pivots for Shears, of which the following is a specification, reference being had to the accompanying drawings.

This invention relates to improved pivots for shears or scissors and has for its primary object to provide a novel device of this character for connecting the shear blades whereby the same may be freely moved with relation to each other and yet held in their proper coöperative positions and liability of loosening or separation at the point of connection entirely obviated.

Another object of the invention is to produce a pivot for connecting shear blades whereby the tendency of said connection to loosen in the use of the shears and thus permit the separation of the blades is eliminated while at the same time, the pivot may be easily and quickly removed and the blades disconnected in order that the same may be readily repaired or sharpened.

A still further object of the invention is to produce a pivot for shears which is extremely simple in its construction, may be easily and quickly assembled in the shear blades and is strong, durable and serviceable in practical use.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawing, in which—

Figure 1 is a side elevation of a pair of shears provided with my improved pivot; Fig. 2 is a similar view looking at the opposite side of the shears, the fastening screw being removed; Fig. 3 is a section taken on the line 3—3 of Fig. 1; Fig. 4 is a detail perspective view of the pivot bolt; and Fig. 5 is a similar view of the fastening screw.

Referring in detail to the drawings, 5 and 6 designate the shear blades which are of the ordinary form now in common use, and each of said blades is provided with the usual circular openings 7 for the reception of the pivot fastener. It will be noted, however, that the blade 5 is provided in its outer face and at the margin of the opening 7 with an arcuate recess 8, the purpose of which will become clearly apparent as the description proceeds. The walls of the openings 7 in the shear blades at their outer ends are chamfered or beveled as indicated at 9.

The pivot bolt 10 consists of a cylindrical shank which is adapted to be fitted into the openings 7 of the shear blades. This shank has a head 11 formed upon one end, the periphery of which is beveled as indicated at 12 for engagement with the beveled edge 9 of the opening in the blade 5. Upon the edge of the head 11, a radially projecting lug 13 is formed. This lug is adapted to be received in the arcuate recess 8 of the blade 5 and is movable therein, the face of the head 11 of the pivot bolt being flush with the face of the blade 5. The bolt 10 is provided with a threaded bore indicated at 14. In each of the openings 7 of the shear blades, a bearing sleeve 15 is loosely arranged, said sleeves being loosely disposed upon the pivot bolt 10 to turn freely thereon when the blades are manipulated. It will be observed from reference to Fig. 3 of the drawing, that the end of the bolt 10 terminates inwardly of the beveled wall 9 of the opening in the plate 6, and is disposed in spaced relation to the inner edge of said wall.

The fastening screw 16 is adapted to be threaded in the bore of the pivot bolt and, as will be noted by reference to Fig. 5, the head of this screw has a portion of its inner face extending radially from the screw shank as indicated at 17 while the outer edge of said head on its inner face is beveled or chamfered as shown at 18. When the screw has been threaded into the bore of the pivot bolt and the beveled face 18 thereof engaged with the beveled wall 9 of the shear blade 6, the radial surface portion 17 of said head is spaced from or out of contact with the end of the pivot bolt 10. It is to be understood that there is not sufficient friction between the beveled faces 11 and 18 of the pivot bolt and screw against the beveled walls 9 of the respective shear blades to prevent the free turning movement of said blades. It will thus be apparent that when the blades become loosened incident to wear, such wear may be compensated for and the blades tightened upon the pivot bolt by simply threading the shank of the screw 16 into the bore of said bolt, and thereby move the shear blades toward each other. It will thus be apparent that the blades may be freely oscillated upon the pivot bolt after the screw 16 has been tightly threaded into the bore thereof. By the provision of my improved pivot constructed of the two elements above described, it will be obvious that the shear blades may be freely manipulated without danger of the screw 16 becoming disconnected from the pivot bolt 10. It will also be seen that by providing the lug 13 extending in the recess 8, in the face of the blade 5, the pivot bolt 10 is held against turning movement when the screw 16 is unthreaded or disconnected therefrom in order to detach the shear blades. The screw may be readily adjusted to take up the wear of the blades and as the bearing sleeves carried by the blades are loosely engaged with the pivot bolt and may be freely turned thereon, all liability of loosening of the blades in use is effectually overcome. It will be noted that the bearing sleeves 15 are of such width as to permit of their movement longitudinally upon the pivot bolt when the shank of the screw 16 is threaded into said bolt in tightening the shear blades. These sleeves are entirely independent of each other and are freely movable in the openings of the shear blades upon or around the pivot bolt 10, and effectually prevent turning movement of said bolt with relation to the screw, thus eliminating liability of the screw threading outwardly in the bore of said bolt.

From the foregoing, it is thought that the construction and manner of use of my improved pivot will be clearly understood. By means of the same, the shear blades may be easily and quickly connected or disconnected and will properly retain the blades in their relative positions in use and effectually overcome all tendency of the pivot connection to loosen as is a common objection to shears of the ordinary type, now in common use. Any loosening of the blades which may be caused by wear, may be easily and quickly compensated for and the shear blades tightened by simply threading the screw into the pivot bolt as above stated.

It will, of course, be apparent that the invention is susceptible of considerable modification in the form, proportion and arrangement of the several parts without departing from the essential features or sacrificing any of the advantages thereof.

Having thus described the invention, what is claimed is:

1. The combination with shear blades, each provided with an opening, one of said blades having an arcuate recess in its outer face communicating with the opening therein, of a pivot bolt adapted to be fitted into said openings and having a threaded bore, said bolt being provided with a lug movable in the arcuate recess of the shear blade, and a fastening screw threaded in the bore of said bolt having a head countersunk in the face of the other shear blade, substantially as and for the purpose specified.

2. The combination with shear blades each provided with an opening, the outer edge of which is beveled, one of said blades being provided with an arcuate recess communicating with the opening therein, of a pivot bolt adapted to be fitted into said openings having a head on one end, the periphery of which is beveled for engagement with the beveled edge of the opening in one of the blades, a radially projecting lug formed on the periphery of said head and movable in the recess of said blade, said bolt having a threaded bore, bearing sleeves loosely fitted into the openings of the blades and loosely engaged upon the bolt for turning movement thereon, and a fastening screw adapted to be threaded into the bore of said bolt and having a head, the inner face of which is spaced from the end of the bolt, the outer edge of said head being beveled for engagement with the beveled edge of the opening in the other shear blade when said screw is threaded home, substantially as and for the purpose specified.

3. The combination with shear blades each provided with an opening, of a pivot bolt disposed in said openings and having a threaded bore, a fastening screw adapted to be threaded into the bore of said bolt and having a head countersunk in the face of one of the shear blades, the inner surface of said head being spaced from the end of the bolt, and bearing sleeves arranged in the openings of the shear blades upon said bolt and freely movable with respect to the bolt and the shear blades.

4. The combination with shear blades, each provided with an opening, the outer edges of said openings being beveled, a pivot bolt disposed in said openings but of less length than the combined thickness of the blades, said bolt having a head provided with a beveled edge for engagement with the outer beveled edge of the opening in one shear blade, a screw adapted to be threaded into the bore of said bolt and having a head, the inner face of which is spaced from the end of the bolt, said head having a beveled edge to engage the beveled edge of the opening in the other shear blade, and a bearing sleeve loosely arranged in the opening of each shear blade upon said pivot bolt and freely movable around said bolt and longitudinally thereof.

In testimony whereof I hereunto affix my signature in the presence of two witnesses.

JOSEPH W. FOLGERT.

Witnesses:
 JOHN S. BARRY,
 M. K. OWEN.

Copies of this patent may be obtained for five cents each, by addressing the "Commissioner of Patents, Washington, D. C."